Dec. 16, 1952          L. B. BROWN          2,621,699
REMOVABLE TRACTION CLEAT FOR VEHICLE TIRES
Filed July 2, 1951
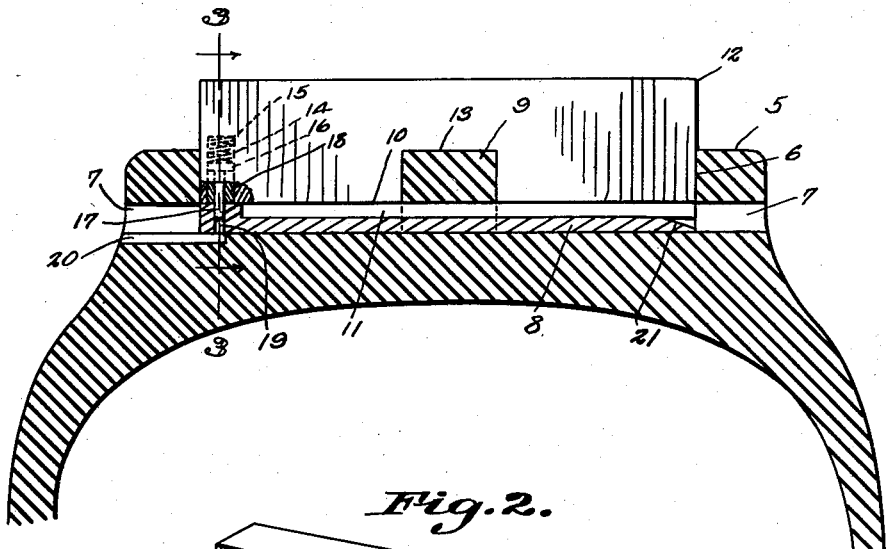
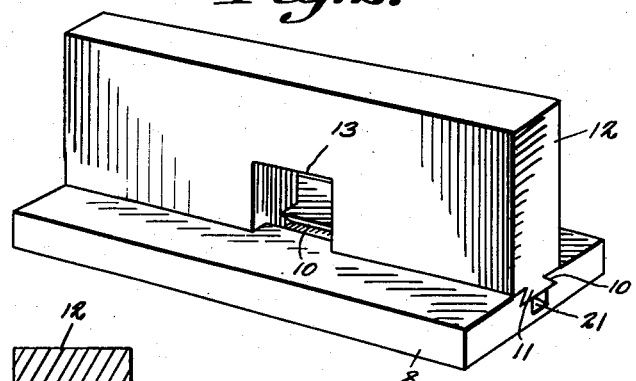
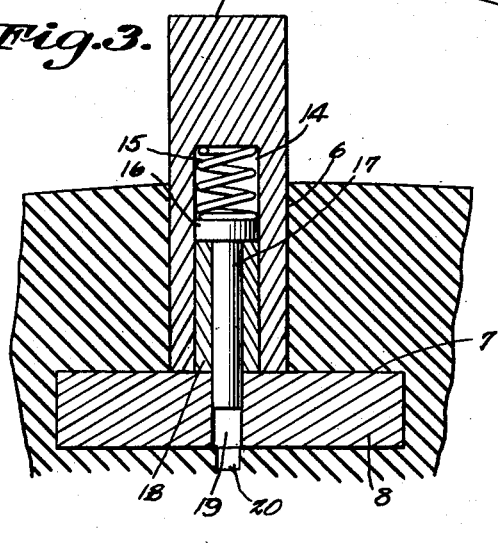
L. B. Brown
INVENTOR
BY C. A. Snow & Co.
ATTORNEYS.

Patented Dec. 16, 1952

2,621,699

UNITED STATES PATENT OFFICE 2,621,699

REMOVABLE TRACTION CLEAT FOR VEHICLE TIRES

Louis B. Brown, Duquesne, Pa.

Application July 2, 1951, Serial No. 234,717

4 Claims. (Cl. 152—210)

This invention relates to vehicle tires and aims to provide a novel form of vehicle tire having removable traction cleats secured thereto, the important object of the invention being to provide means wherein traction may be increased with the minimum of effort on the part of the operator, as the necessity for increased traction arises.

An important object of the invention is to provide a vehicle tire wherein the removable traction cleats may be positioned or removed readily, the traction cleats carrying means for locking them within recesses formed in the tire tread.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a transverse sectional view through a tire tread illustrating a removable traction cleat secured thereto.

Fig. 2 is a perspective view illustrating a traction cleat as secured to its supporting plate prior to positioning in an opening of a tire tread.

Fig. 3 is an enlarged sectional view taken on line 3—3 of Fig. 1.

Referring to the drawing in detail the reference character 5 indicates the tread of a pneumatic tire, which is provided with transversely disposed slots 6 formed therein, the slots 6 being arranged in predetermined spaced relation with respect to each other.

These slots 6 are provided with wide inner portions 7 in which the plates 8 of the tire traction cleats are positioned, the wide inner portions 7 of the slots extending to the side edges of the tire, as shown by Fig. 1 of the drawing, so that these plates may be readily slid into position.

The tread of the tire is so constructed that central enlargements 9 are provided, the enlargements 9 being disposed intermediate the ends of the slots 6.

Each of the plates 8 is provided with a longitudinally disposed groove 10 arranged intermediate the side edges of the plates, the longitudinal grooves being of dove-tail construction to receive the ribs 11 formed longitudinally of the lower edges of the traction cleats 12 associated therewith.

The ribs 11 extend to the central cut-out portions 13 of the traction cleats 12 so that the traction cleats may be fitted over the central enlargements 9 in the manner as shown by Fig. 1 of the drawing, securing the traction cleats against movement longitudinally of the slots 6, the inner ends of the ribs 11 engaging the edges of the enlargements 9.

The traction cleats 12 are each provided with a tubular chamber 14 in which the coil spring 15 is held, the coil spring resting against the head 16 of the lock pin 17 that moves through the hollow guide 18, which is held in one end of the tubular chamber 14, the hollow guide resting on the plate 8 associated therewith.

Each of the plates is formed with an opening 19, which is so arranged that when the plates are moved to their proper positions within the tires, the pins 17 will snap into the openings 19 securing the traction cleats to their plates 8. As shown by Fig. 1 of the drawing, one end of each slot 7 is provided with a groove 20 which is disposed directly opposite to the opening 19 in the plate 8, so that a suitable tool, not shown, may be inserted therein to move the pin 17 to a position to disengage the supporting plate on which the traction cleat is held, disengaging the traction cleat and plate 8 to allow the traction cleat to be readily removed.

As shown by the drawing, the opposite end of the plate 8 is beveled at 21, which beveled surface forms a continuation of the bottom of the groove 10 at one end of the plate, the beveled surface constituting a cam to permit the plate to be extended into the groove of the tire tread, the cam surface engaging the lock pin 17 to force it upwardly to a position where it may be received in the groove 10 and the plate slid to its supporting position.

In positioning a traction cleat, the traction cleat is first positioned in one of the slots of the tire tread with the enlargements 9 of the tire extending into the central cut-out portion 13 of the cleat. The plate 8 is now slid through the wide portion of the transverse slot in which the traction cleat is positioned and when the pin 17 of the traction cleat falls directly over the opening 19 of the plate 8, the pin will snap into the opening locking the traction cleat in position against accidental displacement.

Having thus described the invention, what is claimed is:

1. A vehicle tire having spaced transversely disposed slots formed therein, removable traction cleats positioned in said slots, said cleats having ribs formed longitudinally along the lower edges thereof, spring pressed lock pins mounted within cavities formed in said cleats normally projected beyond the inner edges of the cleats, removable plates positioned within the slots of the tire, said plates having grooves formed longitudinally in the upper surfaces thereof, said plates having openings, and said lock pins being movable into said openings of the plates removably securing the cleats to said plates.

2. A vehicle tire having spaced transversely disposed slots formed therein, removable traction cleats positioned in said slots contacting with the walls of said slots, said cleats having dove-tail ribs formed longitudinally along the lower edges thereof, removable plates slidable within the slots of the tire, said plates having dove-tail grooves in which said ribs of the cleats are disposed, removably securing the cleats to said plates, said plates having openings, spring-projected locking pins mounted in recesses in the lower surfaces of said cleats, said lock pins adapted to move into the openings of the plates, normally securing the cleats and plates together.

3. A vehicle tire having spaced transversely disposed slots formed therein, removable traction cleats positioned in said slots, said cleats having ribs formed longitudinally throughout the lengths of the lower edges thereof, removable plates positioned within the slots of the tire, said plates having grooves formed longitudinally of the upper surfaces thereof in which the ribs of the cleats are disposed, said cleats having tubular chambers extending from the inner edges thereof, hollow guides positioned within the tubular chambers, spring pressed lock pins operating said guides, said lock pins adapted to extend from the inner edges of the cleats, and said plates having openings extending through the centers thereof into which said pins move, normally securing the cleats to said plates.

4. A vehicle tire having spaced transversely disposed slots formed therein, traction cleats positioned in said slots, removable plates positioned within the slots of the tire, means for removably securing said traction cleats to said plates, and lock pins carried by said cleats cooperating with said plates normally securing the cleats to said plates.

LOUIS B. BROWN.

REFERENCES CITED

The following references are of record in the file of this patent:

UNITED STATES PATENTS

| Number | Name | Date |
| --- | --- | --- |
| 1,265,556 | Varner | May 7, 1918 |
| 2,121,740 | Kraft | June 21, 1938 |
| 2,480,548 | Carhart | Aug. 30, 1949 |